United States Patent [19]

Karplus et al.

[11] 4,238,725

[45] Dec. 9, 1980

[54] APPARATUS FOR CHECKING THE DIRECTION OF POLARIZATION OF SHEAR-WAVE ULTRASONIC TRANSDUCERS

[75] Inventors: Henry H. B. Karplus, Hinsdale; Forster George A., Westmont, both of Ill.

[73] Assignee: The United States of America as represented by the United States Department of Energy, Washington, D.C.

[21] Appl. No.: 3,559

[22] Filed: Jan. 15, 1979

[51] Int. Cl.³ .............................................. G01R 29/22
[52] U.S. Cl. ...................................... 324/56; 310/335; 310/357
[58] Field of Search ................. 307/308; 310/334, 335, 310/357, 362; 324/56, 377

[56] References Cited

U.S. PATENT DOCUMENTS 2,089,216  8/1937  Lynton .................................. 324/377
2,186,677  1/1940  Humphreys .......................... 324/377

FOREIGN PATENT DOCUMENTS 1009111  1/1950  France ........................................ 324/56

*Primary Examiner*—Michael J. Tokar
*Attorney, Agent, or Firm*—James E. Denny; Frank H. Jackson; Donald P. Reynolds

[57] ABSTRACT

An apparatus for checking the direction of polarization of shear-wave ultrasonic transducers comprises a first planar surface for mounting the shear-wave transducer, a second planar surface inclined at a predetermined angle to the first surface to generate longitudinal waves by mode conversion, and a third planar surface disposed at a second predetermined angle to the first for mounting a longitudinal-wave ultrasonic transducer. In an alternate embodiment, two second planar surfaces at the predetermined angle are placed at an angle to each other. The magnitude of the shear wave is a function of the angle between the direction of polarization of the transducer and the mode-conversion surface.

4 Claims, 9 Drawing Figures

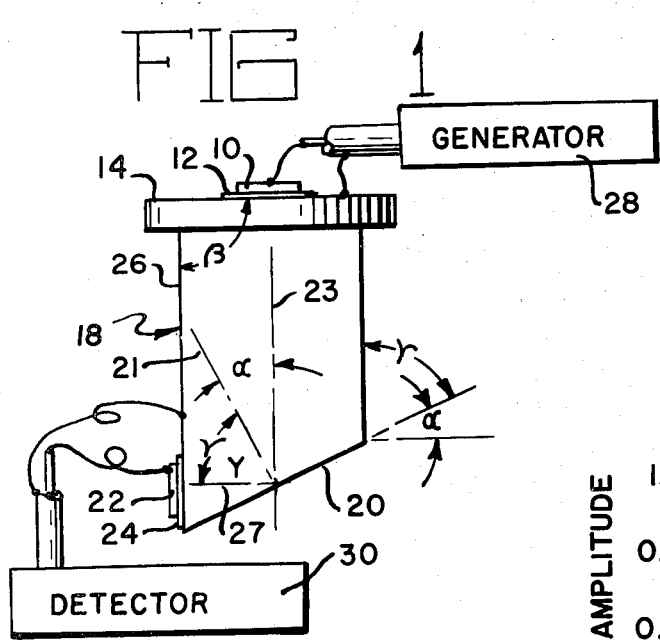
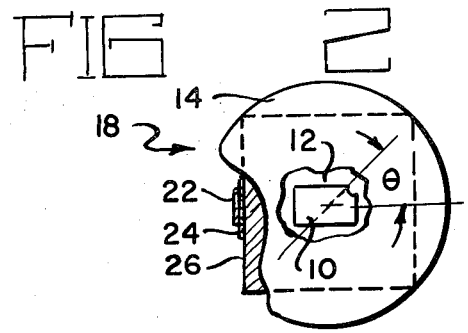
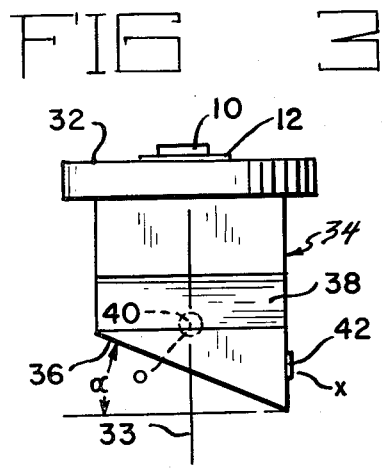
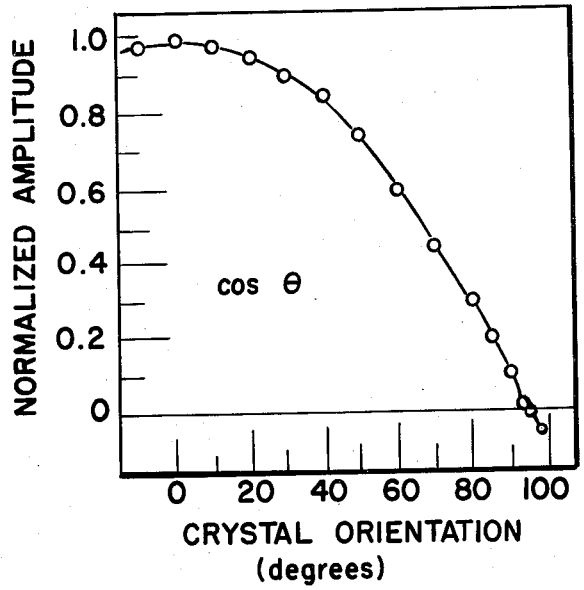
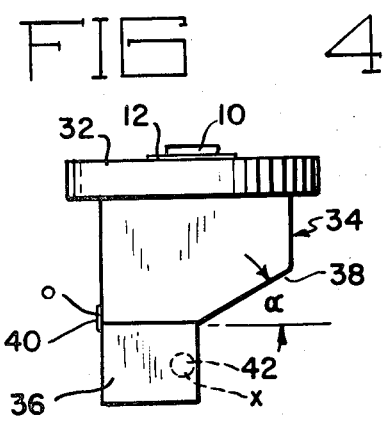
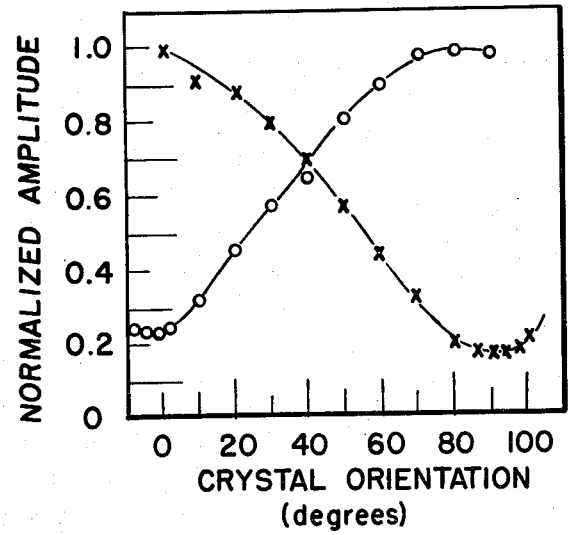

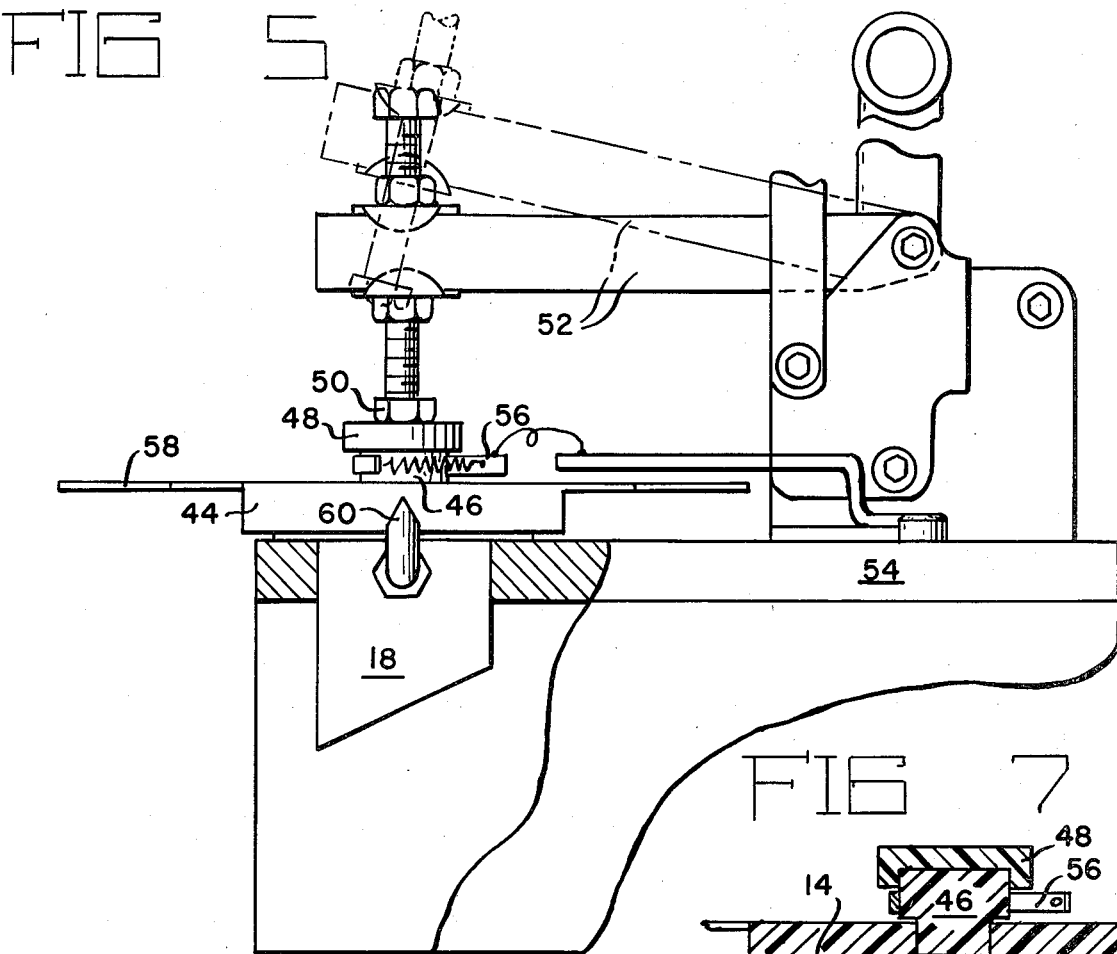
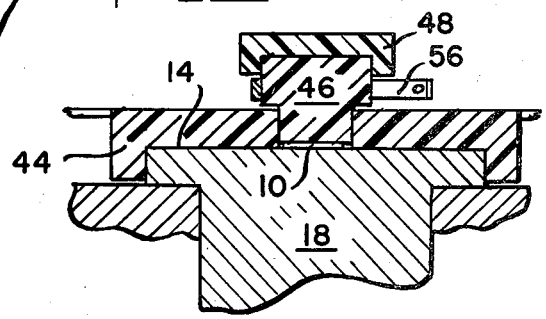
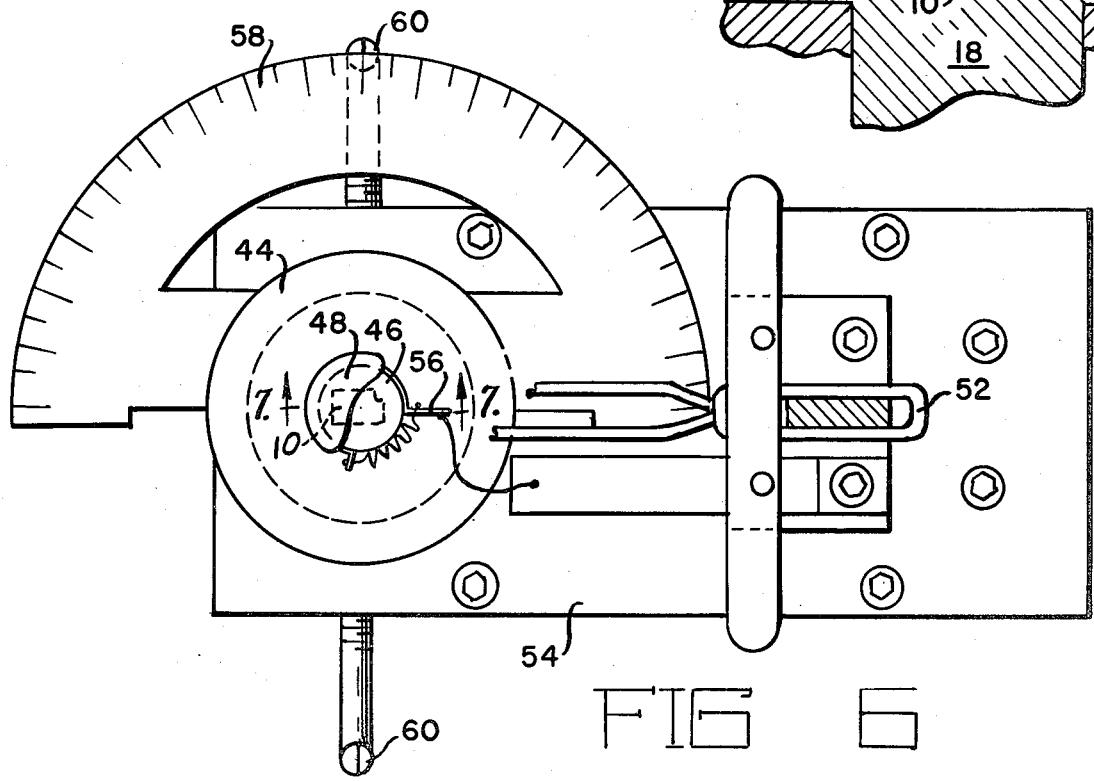

APPARATUS FOR CHECKING THE DIRECTION OF POLARIZATION OF SHEAR-WAVE ULTRASONIC TRANSDUCERS

CONTRACTUAL ORIGIN OF THE INVENTION

The invention described herein was made in the course of, or under, a contract with the U.S. Department of Energy.

BACKGROUND OF THE INVENTION

This invention relates to an apparatus for testing the polarization of transducers.

The conversion between ultrasonic shear waves and electronic signals may be effected with suitable piezoelectric or ferroelectric transducer materials. These may be suitably polarized ceramics or crystals. The direction of polarization is defined as the direction of shear stress generated in response to an electric signal or conversely the optimum direction of the shear stress for generating electric signals. The direction of polarization is customarily marked on the transducer material so that it may be mounted correctly in the transducer assembly. The marking may at times be obliterated or may be marked incorrectly. It would be useful to have a simple device for determining the direction of polarization.

It is an object to the present invention to provide a quick method of checking the polarization of shear-wave transducer material used to develop or detect ultrasonic signals. Other objects will become apparent in the course of the detailed description of the invention.

SUMMARY OF THE INVENTION

An apparatus for checking the direction of polarization a transducer material used to generate or detect ultrasonic signals comprises a test block having three plane surfaces disposed so that one surface receives the shear transducer or transducer material under test, a second surface receives a longitudinal ultrasonic transducer and the third surface effects mode conversion between shear and longitudinal waves. Rotation of the test crystal in its mounting plane provides information sufficient to identify the directions of maximum and minimum mode-converted output, which information provides a measure of the direction of polarization of the test crystal. In an alternate embodiment, the block is shaped to provide two surfaces at the calculated angle for mode conversion to provide such information without rotating the test crystal.

BRIEF DESCRIPTION OF THE DRAWINGS

FIG. 1 is a side view of the mode-converting block of the present invention in a test configuration.

FIG. 2 is a top view of the block of FIG. 1.

FIG. 3 is a side view of an alternate embodiment of the mode-converting block of the present invention.

FIG. 4 is a rotated side view of the block of FIG. 3.

FIG. 5 is a side view of a supporting structure for using the blocks of FIGS. 1 and 3.

FIG. 6 is a top view of the structure of FIG. 5.

FIG. 7 is a partial sectional side view of the apparatus of FIGS. 6 and 7 taken along section line 7—7 of FIG. 6.

FIG. 8 is a plot of a characteristic curve obtained with the block of FIG. 1.

FIG. 9 is a plot of a characteristic curve obtained with the block of FIG. 3.

DETAILED DESCRIPTION OF THE INVENTION

FIG. 1 is a side view of the mode-converting block of the present invention, and FIG. 2 is a top view of the block. In FIGS. 1 and 2, a transducer 10 is mounted by a couplant 12 to a planar surface 14 of block 18. The couplant 12 is a thin layer of a very viscous liquid, obtainable commercially as an acoustical couplant, or else of a solid such as phenyl salicylate that melts near room temperature. Transducer 10 is clamped to block 18 by a mechanism that will be described later but the practice of the invention is best understood by considering the shape of block 18 which is cut to produce a planar surface 20, a normal 21 of which makes an angle alpha with respect to normal 23 to surface 14. Block 18 may be made of an amorphous solid such as fused silica, or of a metal such as aluminum or brass. If a metal is used, the direction of rolling of the metal is preferably specified to be that of normal 23 to reduce the possibility of rotation of the direction of polarization of shear waves. The surface 20 that is defined by angle alpha effects a mode conversion of the shear waves generated by transducer 10 into longitudinal waves that are received by a transducer 22 that is mounted with a couplant 24 to a surface 26 that has a normal 27 coplanar with normals 21 and 23. Normal 27 forms an angle beta with normal 23 and an angle gamma with normal 21. A generator 28 is connected to transducer 10 to generate shear waves and detector 30 is connected to transducer 22 to provide an indication of the strength of mode-converted longitudinal waves that are received by transducer 22. It is possible to reverse the functions of the transducers 10 and 22 so that transducer 22 is driven to produce longitudinal waves and those waves are converted at surface 20 into shear waves which are then detected by transducer 10. In such a case the connections of generator 28 and detector 30 must be interchanged.

The mode conversion that occurs at surface 20 is a function of the fact that in typical solids the velocity of sound for shear waves differs from the velocity of sound for longitudinal waves. For example, the velocity of shear waves in aluminum is 3040 meters per second while the velocity of the longitudinal wave is 6420 meters per second. This leads to the identification of the angle alpha which is the bevel angle of surface 20 as follows. In general, when a sonic wave impacts a surface, two waves will be generated at the surface. One is a shear wave and the other is a longitudinal wave. The two share a common plane with the surface normal and the direction of propagation the incident wave but are reflected at different angles because of their different velocities of propagation. Snell's Law states that the sine of the angle between the surface normal and the direction of propagation is proportional to the velocity of propagation. Referring to the angles alpha, beta and gamma that are identified in FIG. 1, it follows from Snell's law that $\sin\alpha/\sin\gamma = c_s/c_d$ where $c_s$ and $c_d$ are the velocities of the shear and longitudinal waves respectively. Since $\alpha + \gamma = \beta$, the selection of one angle and the selection of a material which fixes the acoustic velocities determines the bevel angle. The choice in FIG. 1 for the angle $\beta$ is $\pi/2$ which means that $\gamma = \pi/2 - \alpha$, then $\sin\alpha/\sin(\pi/2 - \alpha) = \tan\alpha = c_s/c_d$ and $\alpha = \arctan(c_s/c_d)$. Stated more simply, if the surface 26 is perpendicular to surface 14 then the tangent of the bevel angle of surface 20 is equal to the ratio of the sonic velocities. Using the values for aluminum described above, $\alpha = 25° \, 20'$.

The amplitude of the wave that is mode-converted from a shear wave to a longitudinal wave upon reflection at plane 20 of FIG. 1 is proportional to the component of shear stress that is in a plane perpendicular to both planes 14 and 20. This component is measured by angle theta of FIG. 2 which is the angle in the plane of surface 14 between the direction of polarization of transducer 10 and the trace in the plane of surface 14 of a plane perpendicular to surfaces 14 and 20. Thus, the amplitude of the converted component is proportional to the cosine of angle theta. Similarly, if transducer 22 is used to generate a longitudinal wave, a shear wave is generated at surface 20 which is plane polarized in a plane normal to surface 20 and containing the line representing the direction of propagation of the shear wave. Transducer 10 then receives a signal and generates in response an electrical signal that is proportional to the cosine of angle theta.

With a block 18 such as that shown in FIGS. 1 and 2 and with an angle alpha calculated correctly as described, the direction of polarization of the material of a test transducer is obtained by clamping it to surface 14 at a direction chosen at random, exciting it from a generator 28, and measuring the detected amplitude on detector 30. The transducer 10 is then rotated in the plane of surface 14 by a few degrees and the measurement is repeated. A comparison of the amplitude of detected signals with the known orientation of the transducer 10 provides a measure of the direction of polarization of the material of transducer 10 in a way that will be shown later.

FIGS. 3 and 4 show an alternate embodiment of the mode-conversion block for the practice of the present invention. FIG. 3 is a side view of the block and FIG. 4 is a rotated side view. In FIGS. 3 and 4 a transducer 10 is placed against a surface 32 with a couplant 12 placed between them to provide accoustical contact. An axis 33 is perpendicular to surface 32. Transducer 10 will normally be secured by a clamp or other means to ensure good coupling with surface 32 but the clamping mechanism is not necessary to show the operation of the mode-conversion block 34. Block 34 is of a solid material and is doubly beveled. A first bevel provides a surface 36 that is cut at an angle alpha with respect to the plane of surface 32 and hence to axis 33. A second bevel at right angles to the first provides a surface 38 that is also placed at an angle alpha with respect to surface 32 and axis 33. A longitudinal transducer 40 is placed to detect acoustical waves that are mode-converted at surface 38 and a longitudinal transducer 42 is placed to detect waves that are mode-converted at surface 36. When the direction of polarization of the material of transducer 10 is in a plane perpendicular to surfaces 32 and 36 then the signal received by transducer 42 will be a maximum and that received by transducer 40 will be a minimum. Similarly when the direction of polarization of the material of transducer 10 is in a plane that is perpendicular to surfaces 32 and 38 the signal received by transducer 40 will be a maximum. At angles between these two extremes the signals received by transducers 40 and 42 will vary and the received signals can be compared to give a measure of the orientation of the material of transducer 10 without the necessity for rotating it.

FIGS. 5, 6 and 7 are various views of an apparatus for supporting the mode-conversion blocks of the present invention. The apparatus of FIGS. 5, 6 and 7 is designed specifically to support the block 18 of FIGS. 1 and 2 in which case the transducer 10 is rotated for successive readings. It could equally as well be used to support the block 34 of FIGS. 3 and 4 in which case the readings could be made without rotating the transducer 10. Accordingly, FIG. 5 is a side view of a supporting structure to hold and use the apparatus of the present invention. FIG. 6 is a top view of the apparatus of FIG. 5 and FIG. 7 is a partial sectional side view taken along section line 7—7 of FIG. 6. In FIGS. 5, 6 and 7 transducer 10 is held on a surface 14 of the block 18 by an insulating holder 44 and a metal plug 46. An insulating spacer 48 provides the electrical insulation between metal plug 46 and a bolt 50 which is part of a standard welding clamp 52. Clamp 52 is affixed to table 54 which is normally maintained at electrical ground. That ground is connected to block 18 through the physical contact of block 18 with table 54 so that one side of transducer 10 is at electrical ground. Transducer 10 is excited by the application of electrical signals to the other side of transducer 10 through compression plug 46 which is connected through spring clip 56 to a commercially obtained electrical source that operates at ultrasonic frequencies. Insulating holder 44 is connected to a protractor 58 which has a scale that is placed in measuring proximity to a pair of pointers 60. Transducer 22 is clamped or cemented to block 18 and is connected to a detector to enable the measurement of the mode-converted output as a function of the angular position indicated on protractor 58. Clamp 52 is used to make it easy to release the force on transducer 10 while cap 44 and with it transducer 10 is rotated to a new angular position and reclamped.

The results of typical measurements on ultrasonic transducer materials using the apparatus of the present invention are shown in FIGS. 8 and 9. FIG. 8 is a plot of normalized amplitude as a function of transducer orientation for a block of the type shown as block 18 in FIG. 1. Here, the transducer was a piezoelectric crystal. It can be seen that as the transducer orientation is varied for a constant input signal to transducer 10 and transducer 10 is rotated to successively increased angles, the normalized amplitude of signal output passes from a maximum through zero and begins to build with a reversed polarity. The maximum position indicates the direction in which the polarization of transducer 10 is so directed as to produce a maximum amount of mode-conversion for a signal to be detected at transducer 22. When such a position is found it can be marked on the transducer or it can be used to check a pre-existing mark to see whether the crystal is marked properly. Similarly, FIG. 9 shows a comparable set of results using a block similar to block 34 of FIG. 3 and 4. Points in FIG. 9 have been obtained from two detectors placed on the surfaces as described in FIGS. 3 and 4 and the test transducer has been rotated to obtain a plot of the absolute value of the normalized amplitude as a function of orientation for each of the detectors. It can be seen that the two periodic curves shown in FIG. 9 are 90° out of phase and that except for an ambiguity in the region about the crossing of the two curves it would be possible to use the compared values of normalized amplitude to determine the orientation of the transducer with a single measurement.

The embodiments of the invention in which an exclusive property or privilege is claimed are defined as follows:

1. A solid block for determining the direction of polarization of the material of a test shear-wave ultrasonic transducer comprising:

a first planar surface having a first normal, the first planar surface adapted to receive the test transducer in acoustically coupled engagement;

a second planar surface having a second normal that intersects and makes a first predetermined angle with the first normal, the predetermined angle selected to effect mode conversion of a shear wave into a longitudinal wave; and a third planar surface having a third normal coplanar with the first and second normals, the third normal passing through the intersection of the first and second normals, and forming a second predetermined angle with the second normal, the third planar surface adapted to receive a detector transducer to detect a longitudinal wave and generate an electrical signal in response thereto.

2. The apparatus of claim 1 wherein the predetermined angles are defined so that a ratio of the sine of the first predetermined angle to the sine of the second predetermined angle is equal to a ratio of acoustic velocity of a shear wave in the block to acoustic velocity of a longitudinal wave in the block.

3. A solid block for determining the direction of polarization of a test shear-wave ultrasonic transducer comprising:

a first planar surface having a first normal, the first planar surface adapted to receive the test transducer in acoustically coupled engagement;

a second planar surface having a second normal that intersects and makes a first predetermined angle with the first normal, the second planar surface adapted to effect mode conversion of shear waves to longitudinal waves;

a third planar surface perpendicular to the first planar surface and to a plane formed by the first and second normals, the third planar surface having a third normal that passes through the intersection of the first and second normals, the third planar surface adapted to receive a transducer for detecting longitudinal acoustic waves;

a fourth planar surface having a fourth normal that intersects and makes the first predetermined angle with the first normal, the fourth surface related spatially to the second surface by representing a rotation of the second surface by 90° about the first normal, the fourth planar surface adapted to effect mode conversion of a shear wave into a longitudinal wave; and a fifth planar surface perpendicular to the first and third planar surfaces and to a plane formed by the first and fourth normals, the fifth planar surface adapted to receive a transducer for detecting longitudinal acoustic waves.

4. The block of claim 3 wherein the tangent of the first predetermined angle is equal to the ratio of the velocity of the acoustic shear wave to the velocity of the longitudinal wave.

* * * * *